US008208014B2

(12) United States Patent
Geiger et al.

(10) Patent No.: US 8,208,014 B2
(45) Date of Patent: Jun. 26, 2012

(54) ELECTRONIC SHOPPING CART DISPLAY SYSTEM

(75) Inventors: Mark A. Geiger, Draper, UT (US); Paul G. Begum, Salt Lake City, UT (US); Sean McElroy, Draper, UT (US); Marlow Draney, Murray, UT (US)

(73) Assignee: Klever Marketing, Inc., Salt Lake City, UT (US)

( * ) Notice: Subject to any disclaimer, the term of this patent is extended or adjusted under 35 U.S.C. 154(b) by 821 days.

(21) Appl. No.: 09/871,493

(22) Filed: May 31, 2001

(65) Prior Publication Data

US 2001/0028301 A1  Oct. 11, 2001

Related U.S. Application Data

(60) Provisional application No. 60/209,900, filed on Jun. 7, 2000.

(51) Int. Cl.
*H04N 7/18* (2006.01)
(52) U.S. Cl. ........................................................ 348/61
(58) Field of Classification Search ............. 280/33.992; 235/380, 383; 705/23, 10; 364/401
See application file for complete search history.

(56) References Cited

U.S. PATENT DOCUMENTS

| | | | | |
|---|---|---|---|---|
| 2,964,140 | A | 12/1960 | Berezny | 188/111 |
| 4,882,724 | A | 11/1989 | Vela et al. | 364/401 |
| 4,896,894 | A * | 1/1990 | Singletary | 280/30 |
| 4,973,952 | A | 11/1990 | Malec et al. | 340/825.35 |
| 5,111,606 | A | 5/1992 | Reynolds | 40/642 |
| 5,158,310 | A * | 10/1992 | Tannehill et al. | 280/33.992 |
| 5,201,010 | A | 4/1993 | Deaton et al. | 382/7 |
| 5,237,620 | A | 8/1993 | Deaton et al. | 382/7 |
| 5,250,789 | A * | 10/1993 | Johnsen | 705/14 |
| 5,264,822 | A * | 11/1993 | Vogelman et al. | 340/286.01 |
| 5,287,266 | A | 2/1994 | Malec et al. | 364/401 |
| 5,295,064 | A | 3/1994 | Malec et al. | 364/401 |
| 5,305,196 | A | 4/1994 | Deaton et al. | 364/401 |
| 5,327,508 | A | 7/1994 | Deaton et al. | 382/7 |
| 5,388,165 | A | 2/1995 | Deaton et al. | 382/7 |
| 5,420,606 | A | 5/1995 | Begum et al. | 345/165 |
| 5,430,644 | A | 7/1995 | Deaton et al. | 364/401 |
| 5,448,471 | A | 9/1995 | Deaton et al. | 364/401 |
| 5,592,560 | A | 1/1997 | Deaton et al. | 382/100 |
| 5,621,812 | A | 4/1997 | Deaton et al. | 382/100 |
| 5,630,068 | A | 5/1997 | Vela et al. | 395/201 |
| 5,638,457 | A | 6/1997 | Deaton et al. | 382/100 |
| 5,640,002 | A * | 6/1997 | Ruppert et al. | 235/462.46 |
| 5,642,485 | A | 6/1997 | Deaton et al. | 395/214 |

(Continued)

*Primary Examiner* — David Czekaj
(74) *Attorney, Agent, or Firm* — Kirton McConkie; Michael F. Krieger

(57) ABSTRACT

An advertising and promotion system including an electronic shopping cart display screen that provides wireless in-store advertising and promotions. In embodiments of the present invention, the advertising and promotion system includes a display unit attached to a shopping cart, a plurality of store-wide transceiver units, an audible alert component on the display unit for signaling receipt of information from the transceiver unit, a host computer for operating the advertising and promotion system, and a battery charger for powering the display unit. The display unit includes a liquid crystal display ("LCD") panel for displaying animated graphic advertisements and other visual messages automatically exhibited in the proximity of a transceiver unit by a desired product display. The display unit may be interactive (i.e., capable of responding to user information requests and directions) or passive (i.e., only requiring the shopper to push the cart down the aisle where it will automatically receive a signal and alert the shopper to promotions and advertised specials).

24 Claims, 6 Drawing Sheets

U.S. PATENT DOCUMENTS

| | | | |
|---|---|---|---|
| 5,649,114 A | 7/1997 | Deaton et al. | 395/214 |
| 5,675,662 A | 10/1997 | Deaton et al. | 382/137 |
| 5,687,322 A | 11/1997 | Deaton et al. | 395/214 |
| 5,703,564 A | 12/1997 | Begum et al. | 340/539 |
| 6,012,244 A | 1/2000 | Begum et al. | 40/661.03 |
| 6,032,127 A * | 2/2000 | Schkolnick et al. | 705/23 |
| 6,098,048 A * | 8/2000 | Dashefsky et al. | 705/10 |
| 6,123,259 A * | 9/2000 | Ogasawara | 235/380 |
| 6,168,079 B1 * | 1/2001 | Becker et al. | 235/383 |
| 6,177,880 B1 | 1/2001 | Begum | 340/825.35 |
| 6,484,939 B1 * | 11/2002 | Blaeuer | 235/383 |

* cited by examiner

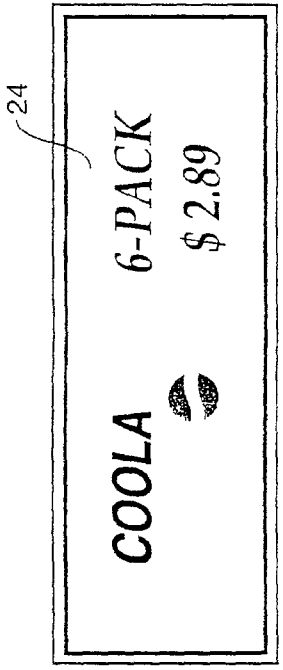
Fig. 9
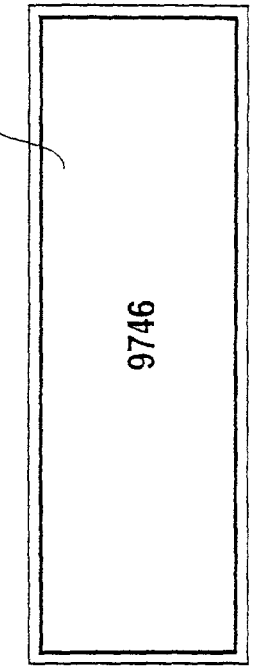
Fig. 10
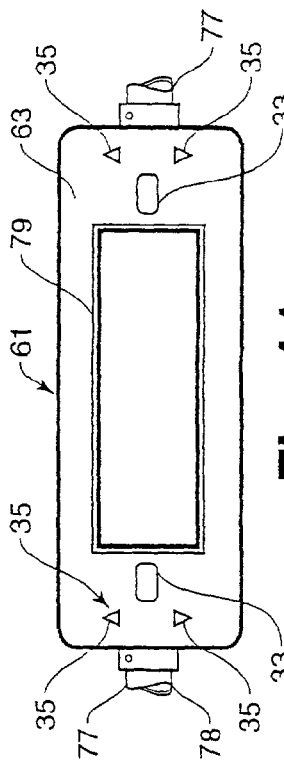
Fig. 11
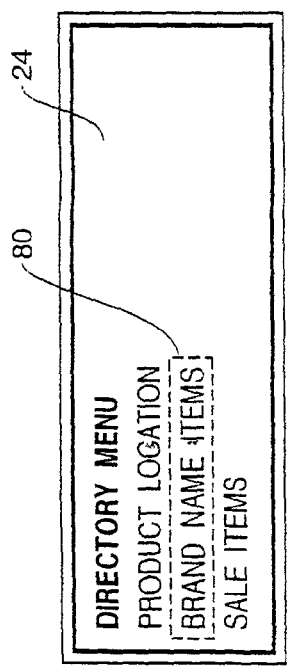
Fig. 6
Fig. 7
Fig. 8

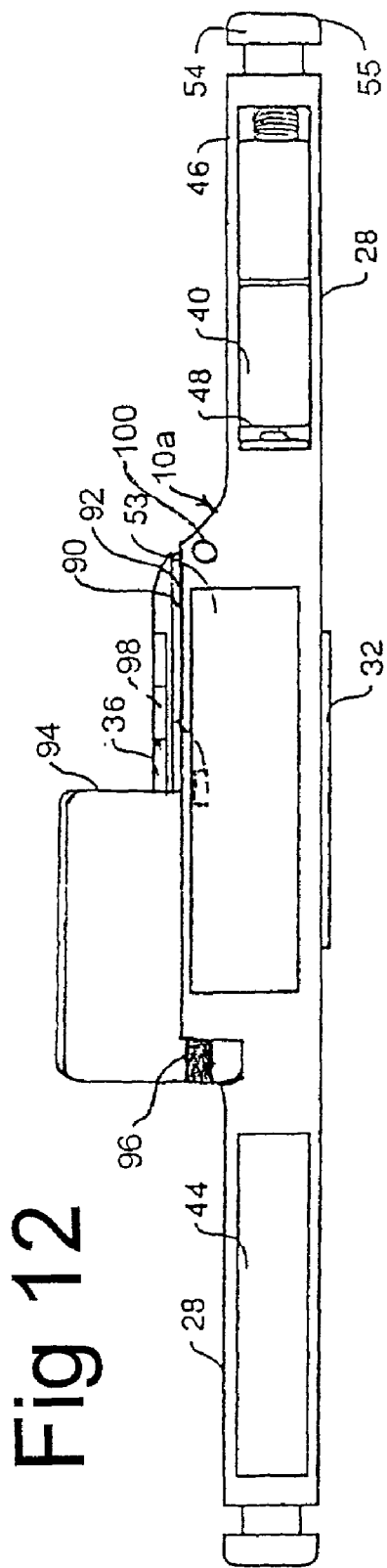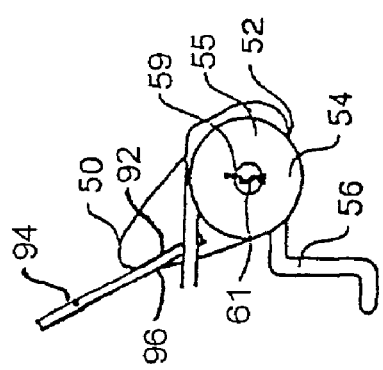

ELECTRONIC SHOPPING CART DISPLAY SYSTEM

RELATED APPLICATIONS

This application claims priority to U.S. patent application Ser. No. 09/767,433, filed Jan. 23, 2001, which is a division of U.S. patent application Ser. No. 08/090,285 filed on Jul. 12, 1993 and issued as U.S. Pat. No. 6,177,880, which is a continuation-in-part of U.S. patent application Ser. No. 07/821,079 filed on Jan. 16, 1992 and now abandoned, and U.S. Provisional Patent Application Ser. No. 60/209,900, filed Jun. 7, 2000, the entire contents of each of these applications being hereby incorporated herein by reference.

FIELD OF THE INVENTION

This invention relates generally to an in-store electronic promotional system, and more particularly, to an electronic shopping cart display screen that provides wireless in-store advertising and promotions.

BACKGROUND OF THE INVENTION

Approximately 100 million people per week visit over 50,000 large retail stores to purchase products. Reaching purchasers at the point-of-selection while shopping in a store, but before they have made their purchase decisions, is crucial. Industry research indicates that approximately 70% of brand selection decisions are made at the last minute prior to purchasing.

Current in-store promotions include coupons, promotional fulfillment, product samples and in-store services. Higher growth is expected for products that utilize technology to improve the efficiency and effectiveness of the promotion process. For example, data collection and distribution capabilities of the internet have enabled marketers to build profiles of individual consumers and efficiently deliver advertising that is relevant to their interests and spending habits. As a result, the market for such "micro-marketing" is growing much more rapidly than the overall market.

There remains a need to provide a more satisfactory solution to providing in-store advertising and promotions to shoppers while they at the point-of-selection of a product, ready to buy.

SUMMARY OF THE INVENTION

The present invention was developed to fill a need for a device which effectively and inexpensively provides in-store wireless electronic advertising and promotion.

The present invention seeks to resolve a number of the challenges which have been experienced in the background art. More specifically, the apparatus and method of this invention constitute an important advance in the art of in-store wireless electronic advertising and promotion.

In one particular embodiment, an advertising and promotion system is provided, in accordance with the principles of the present disclosure. The advertising and promotion system may include a display unit on a shopping cart, a plurality of store-wide trigger or transceiver units, a host computer and a battery charger connected to the display unit and mounted on a desired location on the shopping cart. The display unit may contain an easily readable electronic liquid crystal display ("LCD") panel that attaches to a shopping cart, such as to the handle. Alternatively, the display unit may be integrally designed as part of the shopping cart handle. Animated graphic advertisements and other visual messages may be automatically exhibited on the display unit at the point-of-selection via infrared ("I.R.") or radio frequency ("R.F.") technology. A soft audible chime emitted from the display unit may be included to alert shoppers as they approach a featured product. The display unit may be interactive (i.e., capable of responding to user information requests and directions) or passive (i.e., only requiring the shopper to push the cart down the aisle where it will automatically receive a signal and alert the shopper to promotions and advertised specials). The advertising and promotion system may be easily programmed, thereby permitting customization for seasonal, geographical or other demographic characteristics. A removable, rechargeable battery may power the display unit.

A plurality of trigger units may be mounted throughout the store at the point of product display to advertise or promote a desired product. A transceiver unit automatically sends a message to the display unit, which causes the product-specific promotion to appear on the screen and a soft audible chime to alert the shopper of the approaching promoted product. Transceiver units may also function as feature aisle signs and may utilize a red flashing light to attract the consumers' attention. The store-wide plurality of transceiver units may be positioned within a particular store as desired.

Using commonly available software, a particular graphic advertisement message may be created by, or for, the advertiser on a personal computer and transmitted to a communications center. A communications center may be utilized which customizes the advertisement pursuant to advertiser specifications and parses the advertisement to the appropriate store locations. An in-store host computer then processes the information received from the communications center and transmits the advertisement to the memory of the display unit via a R.F. transceiver. A new advertisement may be made available for consumer interaction via the transceiver unit placed at the location of the promoted product. The in-store host computer may include sufficient capacity for future expansion of the advertising and promotion system, including other e-commerce applications.

The battery charger unit may consist of a portable cabinet that holds a complete set of display unit batteries and can easily be moved to suit the individual needs of a store. The rechargeable batteries may operate a display unit for 30 days before being exchanged with fully charged batteries.

In addition to advertising, promotions and a possible store directory, the advertising and promotion system may have the ability to connect the shopper directly to internet content, including but not limited to, news, sports, weather, meal planning, etc. This feature enables the advertising and promotion system to directly deliver web-page messages to shoppers via the internet.

In another embodiment, the electronic shopping cart handle may include a low-profile, central display screen and a minimum of two thumb controls for selecting the directories and scrolling the lists, which are displayed on the display screen. An optional third control comprising an elongated cross bar may be included to multiply the options of the scroll buttons.

In a further embodiment, the display unit may include an internal operating system that would enable the device to incorporate efficient power management in order to maximize the life of the battery provided for each device. The display unit may be powered by standard C or D alkaline batteries, which can be replaced periodically. The display unit may also be powered by rechargeable lithium batteries. The battery may also be supplemented with a radiation cell bank that generates a trickle power from overhead fluorescent lighting, microwave or infrared beacons in the shopping market. The display unit may also be configured to coordinate the transmission of the graphic signal to the display unit in a limited window of time available for transmission. Since the point of purchase promotion is most effective when the customer is at the proximate shelf location of the promoted item, the graphic may be transmitted, received and formatted for display in the brief time that the shopper is strolling past the promoted item.

In another embodiment, an integrated chip incorporating an entire computer on a chip may be used. This allows the essential processor and memory unit to be compact and provide for a low-profile configuration of the display unit. Integrated chips and a low-profile display screen coupled by a battery may reduce the required maintenance resulting from the periodic task of recharging the battery. This is particularly beneficial for those retail stores open 24 hours a day.

Another embodiment may be a dedicated appliance computer capable of being reprogrammed in order to add additional features to the device as users become more sophisticated. Such features as the automatic display of advertisements at select store locations and the global updating of displayable data by wireless transmissions are described hereafter. An infrared or radio frequency receiver in the display unit may also be used for an alarm when the cart or handle leaves a prescribed area such as a store parking lot. Furthermore, the advertising and promotion system may also provide automatic features that are beneficial in facilitating automatic update of the promotional advertisements. Another feature may also be included to allow a user to scroll through the promotional products to locate items of particular interest. Another feature may include a separate promotional program for advertisers in which a screen graphic of the promoted item is displayed from memory periodically during the use of the shopping cart by a shopper, regardless of the cart's location in the marketing area.

BRIEF DESCRIPTION OF THE DRAWINGS

FIG. 6 is an informational screen display of a directory menu on a display unit;

FIG. 7 is an informational screen display of a product listing by brand name on a display unit;

FIG. 8 is an informational screen display of a generic product location list on a display unit;

FIG. 9 is an informational screen display of a product advertisement on a display unit;

FIG. 10 is an informational screen display of a prize code number on a display unit;

FIG. 11 is another embodiment of the display unit;

FIG. 12 is a rear view of another embodiment of the display unit which further includes a data card reader;

FIG. 13 is a side view of the display unit illustrated in FIG. 12;

DETAILED DESCRIPTION OF THE INVENTION

Figure 1:
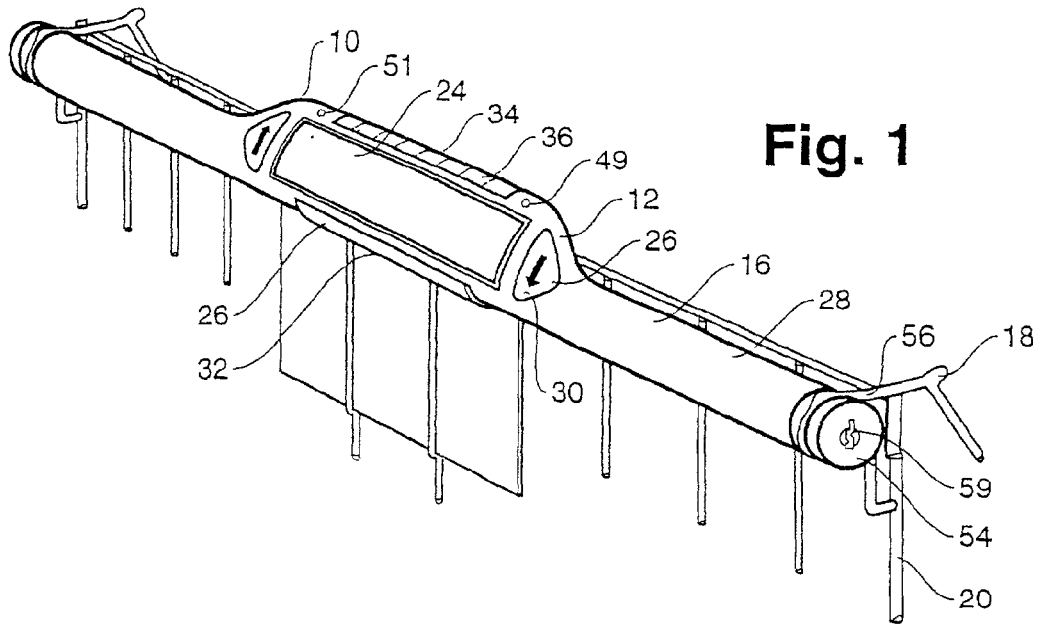
FIG. 1 is a perspective view of a display unit on a shopping cart handle in accordance with the principles of the present invention.

Referring to FIG. 1, an embodiment of an electronic shopping-cart display handle of this invention designated generally by the reference numeral 10, comprises an electronic display unit 12 with a hand bar 16 of a shopping cart 18 to produce an ergonomically designed, informational aid for shoppers. The display handle 10 is mounted to the frame structure 20 of a conventional shopping cart 18, a portion of which is shown in FIG. 1. The unitary construction of the display unit 12 and hand bar 16 allows the handle 10 to adopt a contoured, low-profile configuration that minimally interferes with the traditional operations of moving the cart and placing items into the cart. The handle 10 may be shaped without sharp edges or corners that may injure a child transported in the cart. The handle 10 may also be designed to optimize the visibility of a centrally located display screen 24 without blocking the shopper's view of the contents of the shopper's cart 18.

The display unit 12 may include a plurality of operator controls 26. In one embodiment, the controls are operable by the shopper's thumbs without removal of the shopper's hands from hand grip sections 28 of the hand bar 16. The primary operator controls may be scroll buttons 30 mounted on each side of the display screen 24. In a particular embodiment, the display screen 24 may automatically display periodic promotional items and the user controlled feature may be limited to a categorical product directory. The scroll buttons 30 may be designed to allow a user to scroll up or down the product category list to find the location of selected items in the product directory.

A selection bar 32 may be included for multiple directories or hierarchical lists. The selection bar 32 may be centrally positioned below the screen 24 for manipulation by either thumb. The selection bar 32 may be replaced with two spaced selection buttons 33 located proximate the dual scroll buttons 35 on each side of the screen 24 as shown in FIG. 11. This allows for control by a single thumb of either hand. The selection bar 32 and functionally equivalent selection buttons 35 expand the programmable features that can be incorporated, and can be operated alone or in conjunction with one or both of the scroll buttons 30.

Figure 2:
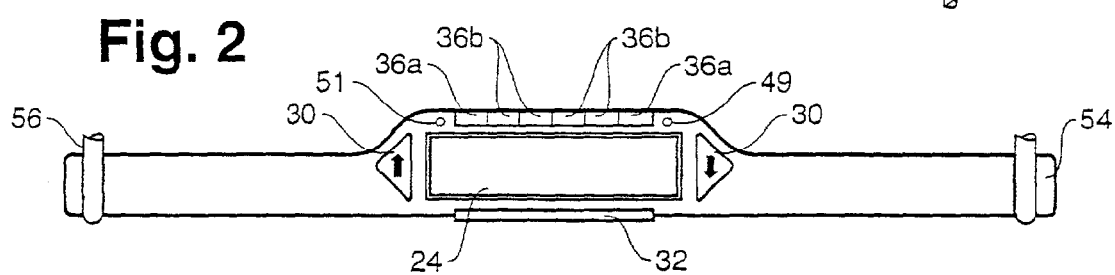
FIG. 2 is a front view of the display unit illustrated in FIG. 1.

The display unit 12 may also include a radiation window 34 centrally located above display screen 24. The radiation window includes multiple cells 36, which may comprise receivers for receiving microwave, infrared or other air propagated radiation energy for power supplementation or for reception of external data or control signals transmitted by microwave, infrared or radio signals. In the embodiment shown in FIG. 2, end cells 36a may be utilized for receiving trigger signals emitted from signal transmitters positioned at strategic locations at the perimeter of a shopping establishment to trigger an alarm on the cart and at a central monitoring station in the establishment. The cells 36a may also be used to receive trigger or message signals from a plurality of transmitters positioned strategically along each side of grocery aisles. These signals may activate the display of select promotional advertisements on the display screen 24. The cells 36a may be used to receive digital message signals from the strategically positioned transmitters.

Central cells 36b may be utilized as power reception cells for receiving power from a radiation power source which may be located over a shopping cart corral or storage area. Alternatively, the radiation window 34 may receive acoustical energy using ultrasonic acoustical wave patterns. The acoustical wave patterns emitted from acoustical emitters are received by audio transducers (not shown) and processed in a similar manner as infrared transmissions.

The unitary construction of the display unit 12 and hand bar 16 enables the interior of the hand bar 16 to be utilized as a space for a battery pack 40. Thus, a relatively substantial battery pack can be formed in the hand bar 16 without intruding on the compact size of the display unit 12.

Figure 3:
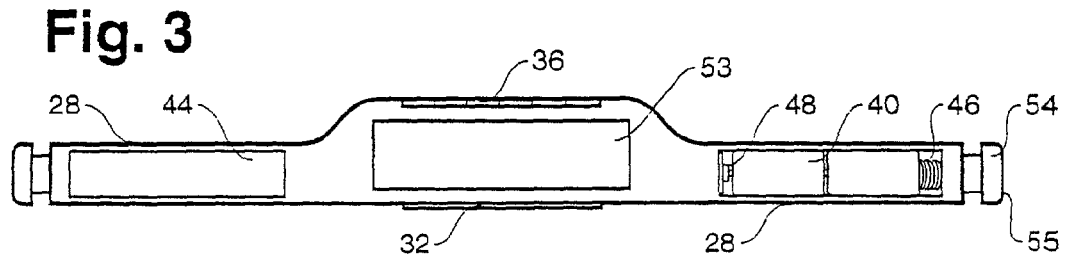
FIG. 3 is a rear view of the display unit illustrated in FIG. 1.
Figure 4:
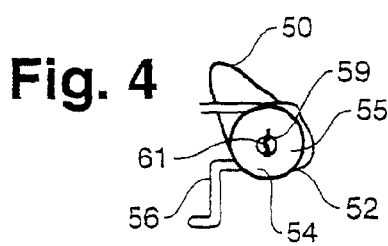
FIG. 4 is a side view of the display unit illustrated in FIG. 1.

In the embodiment shown in FIG. 3, the power or battery pack 40 may comprise four standard size "D" alkaline batteries 42 located in the hand grip sections 28 of the hand bar 16. As shown in FIG. 3, the battery pack 40 may have access covers 44, one of which is removed to show a conventional coil spring contact 46 and a leaf spring contact 48 for tapping the electrical potential of the batteries. The batteries on each side may be interconnected in series to provide a 6 volt potential for 5 volt operating components. A red, low-battery cue light 49 may be positioned above the display screen 24 opposite a green cue light 51 for sale items being flashed on the screen.

Where further miniaturization is desired for the display unit 12, the internal electronic components (not shown) may be confined to the crown portion 50 of the handle 10 profiled in FIG. 4, with the hand bar portion 52 optionally dedicated to a battery pack for maximized operating life between battery replacement or recharge of rechargeable batteries. An access cover 53 on the back of the unit may provide access to the electronic components.

The shopping cart handle 10 includes an attachment mechanism 54 for mounting the handle to frame structure 20 of a shopping cart 18 with minimal modification to the particular shopping cart 18. The attachment mechanism may vary according to the construction of the cart. For example, where a cart has a wire frame loop 56 as shown in FIG. 1, end plugs 55 having a lock 59 with a slot 61 for a locking key (not shown) may be used to lock the handle 10 to the cart 18 and allow only restricted removal of the hand bar 16 from the cart 18 during servicing or replacement.

Another embodiment of the display unit 63 shown in FIG. 11 is mounted to a conventional shopping cart push bar 77 by means of a clamping mechanism 78. The display unit 63 may have similar selection buttons 33 and scroll buttons 35 on each side of the display screen 79 accessible by either one of the user's thumbs.

The display unit 12 is designed for implementation with wide variety of shopping carts. The display unit 12 may be a low-profile design utilizing a relatively compact, inexpensive display screen 24, such as approximately two inches in height by four inches in width. Since the display screen 24 consumes most of the power, a minimized size coupled with an efficient power management program, which deactivates the screen during periods of non-use, enables an extended power pack life. A display screen 24 for maximized contrast with minimized power consumption may be a liquid crystal display module utilizing a super-twisted, nematic crystal technology with an ultra-thin, polymer film layer (STN with FILM) for maximum contrast and viewing angle. A screen with a graphic display detail of 240×80 pixels may be utilized for text and advertisement logos. For convenience, the promotional text and pictorial composite displayed on the display screen is called a screen graphic. A double retardation film LCD of this pixel density manufactured by Hitachi may be utilized. Miniature Color screens as utilized in portable game devices by Nintendo, Sega and NEC may be used with appropriate power management.

A low-power driver/controller chip may be used to control the screen with direction from a central processor with add-on memory chips. Alternatively, a specially designed processor chip or computer-on-a-chip may be used for low power operation. With the addition of conventional RAM and ROM chips for supporting the minimal memory requirements of the display unit, the integrated computer chip minimizes power consumption and is programmable for controlled activation and suspension. Adoption of a 3.3V power system, may further reduce power requirements of transistors and allow six 1.5V batteries in a battery pack to be combined in two, parallel 3-battery packs for a greater power reserve.

Battery recharge or replacement on two month intervals is typical for a low-maintenance shopping cart system with electronic display handles utilizing currently available components. A system with an optimized low-voltage power with some in-service charging may last six months.

Figure 5:
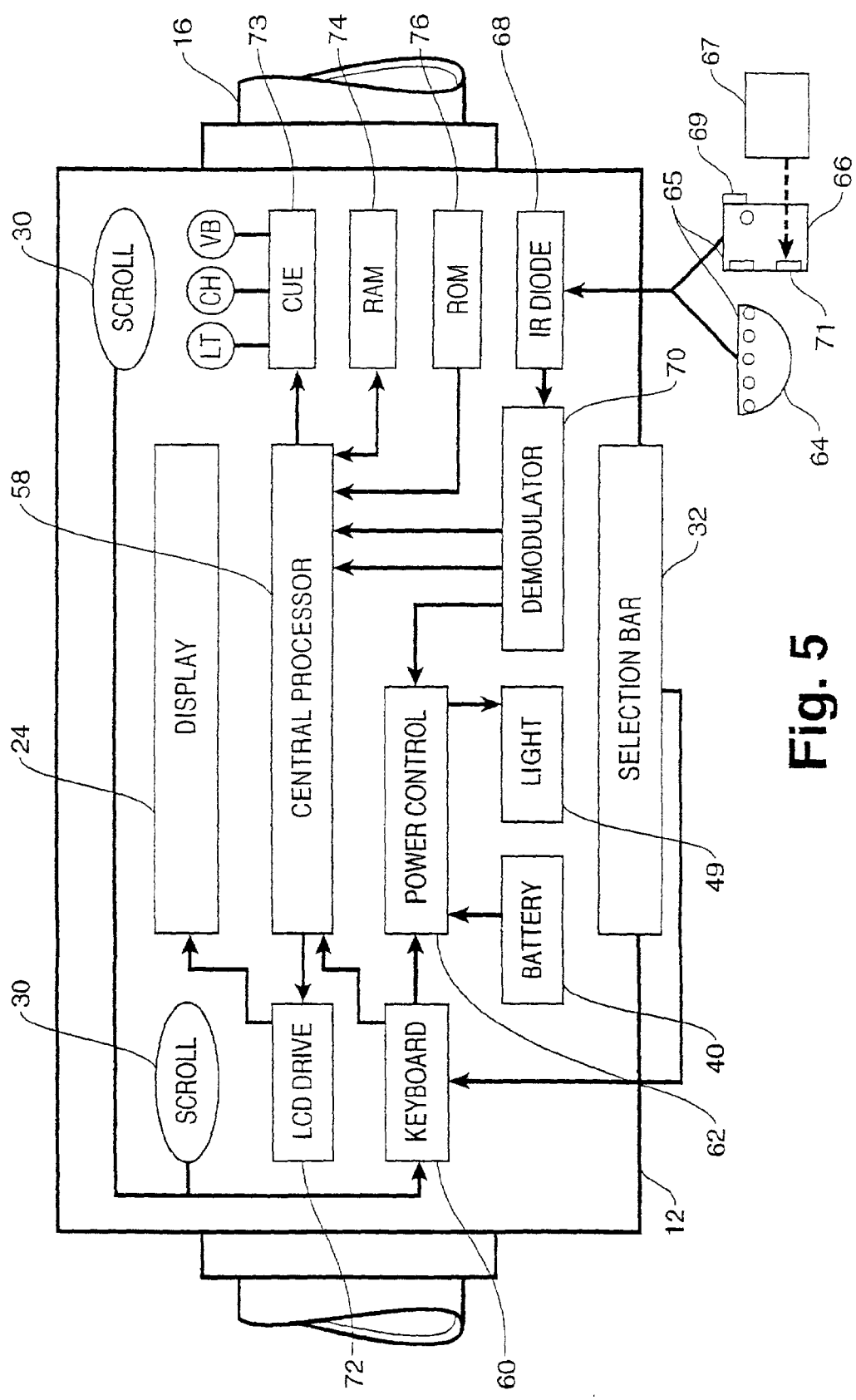
FIG. 5 is a schematic diagram of the electronic operating components in an embodiment of a display unit.

Referring to the embodiment illustrated in FIG. 5, the display unit 12 contains a central processor 58 which is an integrated circuit chip for programs to control the system operation. The processor 58 receives and directs data for operation of the display unit 12. The processor 58 connects to a standard keyboard chip 60, which may be integrated into the processor 58. The keyboard chip 60 includes the circuitry necessary to interpret signals from the scroll buttons 30 or the selection bar 32.

The keyboard chip 60 is connected to the power control circuit 62, which may include a power management program such as initiating screen activation upon a prompt received from the keyboard circuitry when a user depresses a scroll button 30 or the selection bar 32. The power control circuit 62 is connected to the battery pack 40 and assists in regulating and activating the power delivery to the components including the central processor 58. A low-battery warning light may be included which signals the time for replacement or recharge of the battery pack 40.

External components such as an IR beacon 64 and an IR trigger component 66 direct infrared data signals and wake-up signals to the IR photo diodes 68 of the radiation window 34 on the display unit 12. The data signals provide information for reprogramming the memory such as inventory, sales information and the screen display of an activated advertisement and promotional visuals. The IR beacon 64, or equivalent component, may also an indicator that emits a power level status for charge maintenance of the battery pack 40. The IR beacon 64 and trigger component 66 form a transceiver unit 65 for receiving, storing and relaying trigger and data signals from a control unit 67 that centralizes the store-wide operation of the system.

The trigger and data signals are demodulated in a converter circuit 70 and passed to the central processor 58 for reprogramming the memory or activating retrieval of memory packets for the display of advertising information in the display screen 24 under control of the LCD driver and controller circuit 72. The transceiver unit 65 may be hard wired to the control unit 67 for direct communication between the control unit 67 and transceiver unit 65. A store may have a single control unit 67 that is the central computer for management of the store's inventory and accounting. The control unit 67 communicates with a plurality of transceiver units 65 located throughout the marketing area. To minimize installation expenses and allow the plurality of transceiver units 65 to be repositioned in the marketing area as desired, each transceiver unit 65 may be in wireless communication with the control unit 67 and have its own power supply. The transceiver unit 65 includes similar electronic components as the display unit 12 which allows for independent processing of data and independent communication with a display unit 12 on a nearby shopping cart. To conserve power in the transceiver unit 65, the transceiver unit 65 may include a proximity sensor 69 that detects the presence of a shopping cart within range and initiates transmission of the trigger and data signals to the display unit 12 on the cart handle 10. The transceiver unit 65 may also include an RF receiver 71 to receive FM radio frequency transmissions from the central control unit 67. Each transceiver unit 65 can have a separate identification such that data transmitted from the control unit 67 is transmitted store-wide but is processed and stored only by the transceiver unit 65 to which the data is intended.

In another embodiment, the transceiver unit 65, upon detection of a proximately located shopping cart, may transmit a trigger signal to wake-up the display unit 12 on the shopping cart if it is not already in an activated state, and then sends the data signal. The data signal is a digital signal that includes both the product control signals and the screen graphic signal. The product control signals include data about the promotion that is not in the screen graphic and that does not appear on the display screen 24 of the display unit 12. This data may include the universal product identification number, the date or iteration number of the promotional graphic, and the identification number of the transceiver unit 65 which may be useful for tracking the path of a shopper through the market area. Tracking the shopper's path may be useful for prompting special promotions for certain shopper's based on buying patterns. The screen graphic signal contains the digitized data that is received by the display unit 12 and formatted for display on the display screen 24. For example, a compressed screen graphic signal may be decompressed by the central processor 58 before it is relayed to the LCD driver and controller circuit 72. The data signal transmitted by the transceiver unit 65 is then sent at a rate that enables the screen graphic to be displayed within the time window available. For example, using a baud rate of 9600 bits per second and using the black and white screen 24 with an 80×240 pixel count, without compression, a bit mapped screen graphic can be transmitted in about 2 seconds.

The product control data is a short alphanumeric string, which in seven bit ASCII code can be transmitted in a small fraction of a second. Using standard compression algorithms for the bit-mapped screen graphic, the product control data and the promotional screen graphic can be transmitted well within a two second time frame. Using transmission rates together with data compression, larger and higher resolution screens and/or color may be used. The screen graphic may be promotional information that is related to the promotional item located proximate the transceiver unit 65 that is transmitting the screen graphic signal. A typical screen graphic displayed in the display screen 24 is shown in FIG. 9.

The digitized screen graphic is stored in a memory file of the transceiver unit 65 and is periodically updated or replaced by transmissions from the control unit 67.

The trigger and data signals, together with converted D.C. power potentials, are delivered to the power control circuit 62 for system wake-up, and may also trickle feed energy to the battery pack 40. The trigger signal is passed to the cue output circuit 73, which may be an audible chime, a handle vibration or a light. Certain IR trigger components 66 at the store perimeter may not only trigger an audible alarm in the display unit 12, but may include a device, such as a radio, for sending a message to the store office that may also cause an alarm to sound when a cart breaches the perimeter of a specified area.

With the display unit 12 awakened, the data signals are processed by the central processor 58, and the data relating to the screen graphic is compared with existing promotional screen graphics stored in RAM 74. The comparison of digitized screen graphics may be accomplished with a rapid checksum procedure. If a match is found, the screen graphic data is passed from a temporary storage buffer in the central processor 58 to the LCD driver and controller circuit 72 for display on the display screen 24. In the event that there is no match, the processor 58 processes the formatted screen data to the LCD driver and controller circuit 72 for display on the display screen 24 and contemporaneously passes the screen graphic display data together with the accompanying product control data to RAM 74. The screen graphic data and product control data are stored in memory for future comparison with received screen display signals or retrieval by a shopper reviewing the file of product promotions.

The product control signals may be utilized in this compare process for rapidly locating the presence or absence of a particular promotional screen graphic in memory and initiating the display of either the screen graphic in memory or the screen graphic formatted from the screen graphic signal transmitted by the transceiver unit 65. In this manner, the shopping carts in use are continually updated as they pass a transceiver unit 65. Even if an outdated advertisement is stored in memory, the updated advertisement will be presented once the shopper has arrived at the location of the promoted item. The system is self-correcting at the promoted product location, even though this system may potentially store an outdated promotional graphic in memory that is accessible by a shopper during review of the product promotion file using the display unit 12 in an interactive mode.

The random access memory (RAM) 74 and read only memory (ROM) 76 store the systems operations data and reprogrammable user data for displaying information such as the store directory and product information in the display screen 24.

Although the display unit 12 may have the capabilities of a personal computer, a dedicated informational format, as schematically illustrated in FIGS. 6-10, is incorporated to ease user familiarization and to encourage the adoption as a shopping aid. Referring to FIG. 6, the display screen 24 upon activation first displays a directory menu allowing selection of a directory listing to be reviewed. Selection is accomplished using the selection bar 32, which highlights the heading in some manner such as by the box 80 enclosing the "BRAND NAME ITEMS" indicia in FIG. 6.

Upon depressing scroll button 30, an alphabetical listing of items by brand name may be displayed for the user to scroll through and locate a particular item. Items 82 are shown with the size and price for convenience as illustrated in FIG. 7.

To assist a user in locating items, the generic names may be listed with an aisle directory listing for each category as shown in FIG. 8. In one embodiment, an updatable series of advertisements, particularly select sales items for which the product producers or distributors have paid advertisement fees to the system operator, are retained in memory. During a state of activation of the display unit 12 when the shopper is not using the display unit 12, the display screen 24 may be activated for a set time, for example ten seconds, and a select product advertisement is displayed as shown in FIG. 9. The advertisement may contain a sale price, since some shoppers may prefer not to refer to simple product name advertisements. A cue signal, such as a chime, light or handle vibration, may be generated at the beginning of the message to alert the shopper that a promotional message is being displayed. The cue signal may also be generated when the promotional message is activated by the transceiver units 65 located proximate the promoted product. The cue light 51 may be activated as a blinking or steady state light and may be used with one or both of the other signal alternatives as desired. The chime and handle vibration may be effected by the cue output circuit 73 which, as shown schematically in FIG. 5, develops an audio signal delivered respectively to a micro speaker (not visible in FIGS. 1-4), or piezoelectric transducer (not shown) fixed to the inside of the handle bar to vibrate the handle, or an equivalent device.

To increase the likelihood that a shopper will look at the display screen 24 when cued, a prize code may be intermittently flashed on the display screen 24 instead of a scheduled advertisement. This code may be in the form of an automatically reprogrammable four digit number as shown in FIG. 10. When the number is related to the check-out clerk, a monetary coupon or reduction in the checkout tally may be granted.

To decrease the time for scrolling through long product lists, a main product directory may have a limited number of listed items, and scrolling in any directory may be accelerated by depressing the desired scroll button 30 while simultaneously holding down the selection bar 32.

An embodiment of the display unit 12 may incorporate an informational device that retains its function as a hand bar 16 for a shopping cart 18. The display unit 12 may alternatively be constructed for connection to an existing shopping-cart push bar.

Another embodiment is illustrated in FIG. 12, wherein display handle 10*a* has similar elements of the handle 10 shown in FIG. 1. Handle 10*a* includes a data card reader 90 having a card reader slot 92 through which a data card 94 slides for extracting certain basic information such as the user identification. In the embodiment shown in FIG. 12, the data card 94 is a conventional club card having a magnetic strip 96 as partially shown in the rear view of the handle 10*a*.

As shown in FIG. 13, the data card 94 inserts in the slot 92 in such a manner that the magnetic strip 96 engages an internal reading head 98 shown in dotted line in FIG. 12. The data card 94 may also comprise a smart card having an embedded transmitter that transmits an identification code to a transceiver antenna 100 on the handle 10*a*. In this embodiment, the slot 92 may be omitted if the data card 94 is positioned proximate the transceiver antenna 100.

The display unit 12 may further include a scanner for reading a UPC label of a product. Displayed information may include product price, nutritional information, advertisement, discount information, or cross-marketing discounts for another product.

Figure 14:
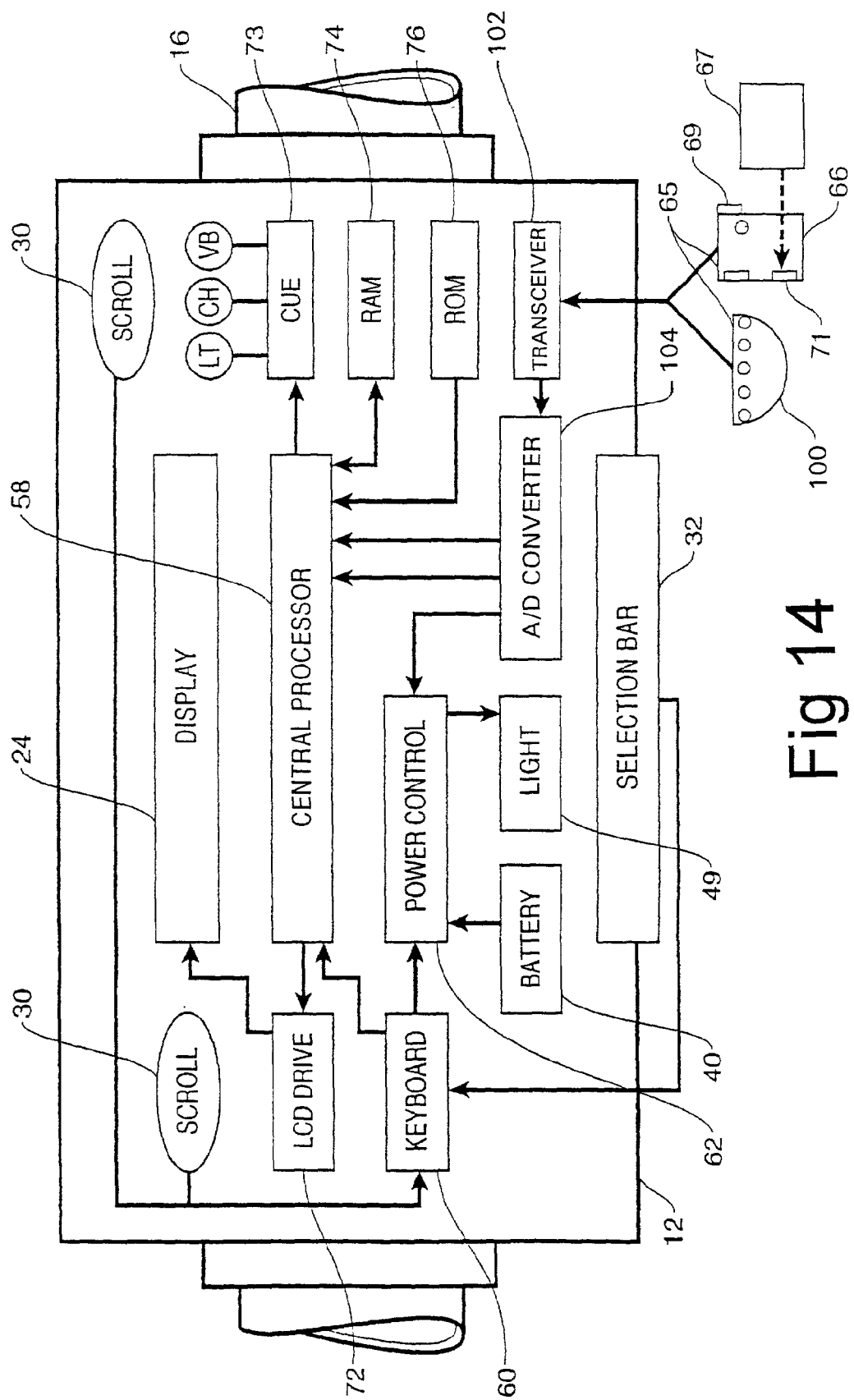
FIG. 14 is a schematic diagram of the electronic operating components of another display unit.

Referring to the embodiment shown in FIG. 14, the transceiver antenna 100 is connected to a transceiver circuit 102 which is connected to an analog/digital converter 104. The signals at the analog/digital converter 104 are converted for processing by the central processor 58 when received or transmitted by the antenna transceiver 102. Where digital transmission signals are utilized, the appropriate circuitry may replace the analog/digital converter 104. Since the communication network within a store is essentially a local area network, the medium may be an RF signal or an ultrasonic signal. A sensor using an ultrasonic signal may also be used to determine the distance between a display unit 12 and a transceiver unit 65. In the embodiment of FIG. 14, the control unit 67 of the store can communicate directly with the central processor 58 of each display unit 12 on a shopping cart 18 in the store. The use of a local RF signal enables telephone-like communication, such as utilizing communication chips from Motorola and other communication chip manufacturers for local, two-way communications.

Figure 15:
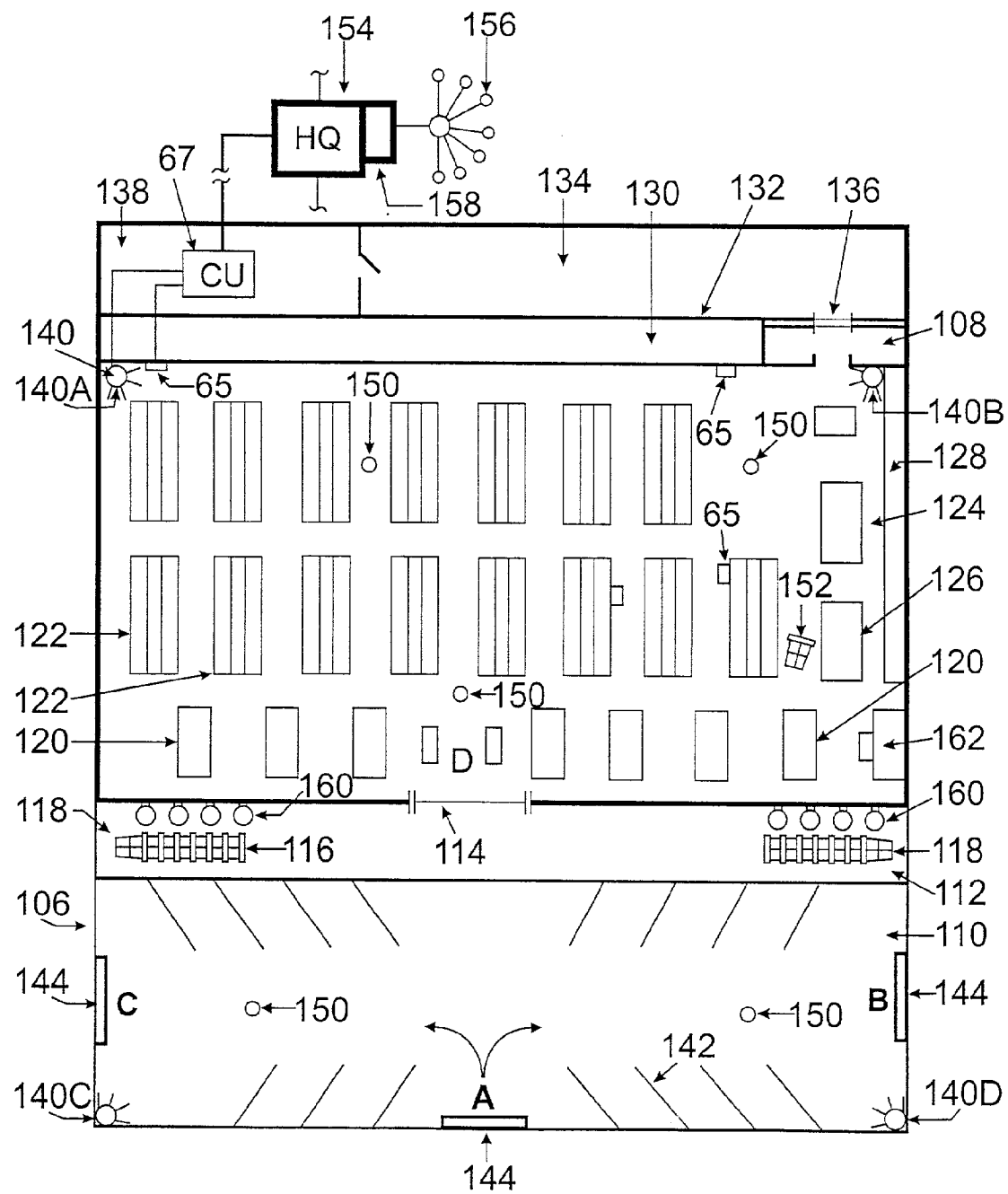
FIG. 15 is a schematic illustration of a marketplace using an embodiment of the advertising and promotion system.

Multi-function RF channels may provide greater adaptability in monitoring the shopping cart's 18 whereabouts in a typical supermarket layout. FIG. 15 illustrates a one example of the layout of a commercial marketplace 106. The marketplace 106 has an enclosed store facility 108 with an adjoining parking lot 110 and a sheltered cart-return foyer 112. When the shopping carts 152 are collected and placed in the cart stacks 118 for storage, a plurality of lights 160 positioned over the cart stacks may act to recharge the batteries through the central cells 36*b* on the display unit 12.

The enclosed store facility 108 may have an entryway 114 for shoppers who may retrieve a cart 116 from the cart stacks 118 at each side of the entryway. The enclosed store facility 108 may have a series of checkout stands 120 and a plurality of product gondolas 122 on which goods for purchase are arranged. In addition, the enclosed store facility 108 may also have a vegetable department 124 with a plurality of tables 126 on which goods are arranged. Similarly, a series of counters 128 and 130 may line the store walls for additional storage of produce, meats and other products typically sold in a supermarket. Behind a back wall 132, a store management and receiving area 134 is shown with an accessible entry 136. A store control unit 67 is shown in an office area 138 accessible by store personnel. The control unit 67 may be connected by hard wire or wireless transmissions to the transceiver units 65 strategically arranged in the store and proximate the locations of goods that are being promoted as previously described.

As an alternate means of communication, the control unit 67 may communicate to a plurality of transceivers 140 through separate channels so that each transceiver unit 65 is independently controlled by the control unit 67. Four transceivers 140A, 140B, 140C and 140D, located in the four corners of the common marketplace 106, in conjunction with transceiver units 65, form a triangulation for locating each shopping cart within the perimeter of the commercial marketplace 106. The transceiver units 65 may be located within the enclosed facility 108 with a second set of transceiver units 65 located in the parking lot 110. In operation, each display unit 12 transmits a periodic location beacon and identification code that is received by the separate channels of the transceivers 140. The signal is processed and cross-checked by selective combinations of the transceivers 140. The display screen 24 of a select display unit 12 can thereby be prompted with a specific promotion or advertisement depending on the location of the cart 152 within the monitored commercial marketplace 106.

The shopping cart 152 may be equipped with an alarm that may be triggered when the shopping cart 152 leaves the perimeter of the commercial market place 106 and parking lot 110. Since the shopping cart 152 is transmitting its identification code, the information of the shopping cart's 152 whereabouts can be indicated at the store facility office area 138 for appropriate action to be taken. Such action may comprise the tracking of the cart to obtain its recovery, or the locking of its wheels by a lock mechanism.

Referring to FIG. 15, the parking 110 has an entrance at A with exits at B and C and a plurality of stalls 142. The entries and exits from the parking lot 110 may include a cart monitoring means 144 to receive the cart identity and activate a triggering device to activate the cart wheel lock-up or tracking signal as the cart leaves the parking lot 110. Alternatively, this may be accomplished by the primary transceiver system acting alone or in combination with the cart tracking means 144. The cart tracking means 144 may comprise a local transceiver unit 65 as previously described or simply a transmitter magnetic strip or magnetizable strip for preventing false triggerings. Another embodiment a positioning detection device on the cart, via radio or ultrasound, that locks the wheels of a cart if it breaches the perimeter of a specified area.

In order to calibrate the transceivers 140A-140D, emitters 150 may be installed throughout the marketplace 106 for determining the shopping carts 152 location.

A GPS system may also be utilized for determining a shopping cart's 152 location.

The store control unit 67 may be connected to a store affiliate headquarters 154 by a phone line, or private wide-area network or through the internet. With this connection, customers, indicated by nodes 156, can communicate through a wired or wireless system to a headquarter web site 158 allowing the users to obtain special coupons, savings bonuses, etc. Moreover, a shopper may access the internet via a home computer and obtain items from the headquarters 154 with an identified user code. Afterwards, when the shopper enters his or her code into the shopping cart display unit 12 by a data card swipe, the user code is transmitted to the store control unit 67 which communicates with headquarters 154 via an e-mail communication system to retrieve any messages, orders, shopping lists, promotions, etc., stored by headquarters 154 for the user. The displayed graphics, promotions, etc., on the display unit 12 are thereafter tailored to the particular user who has identified his or herself by a data card swipe. This transmission does not go to other shopping carts 152 throughout the shopping system.

In the event that a shopper does not have his or her data card, an in-store kiosk 162 may be provided with a data entry terminal and display screen for the selection of coupons, promotions and other material that may be particular to the user. As the shopper enters his or her personal information, the kiosk 162, which is connected to the control unit 67, may retrieve the shopper's identification code and transmit the code to the display unit 12. In this manner, the display unit 12, through the control unit 67, can recover the data personal to the particular shopper. Alternatively, the shopper can identify his or herself by use of the scrolling controls and menu selection in order to select numbers and or letters representing the users code.

In one embodiment, the advertising and promotion system is operated by a software program designated as SMIP (Store Management and Integration Program) at the store affiliate headquarters 154. The SMIP software is utilized for creating ads, passing information to a plurality of stores 108, retrieving information from the stores 108 and creating reports. The software that runs the in-store control unit 67 is designated as SCIP (Store Controller and Interface Program). SCIP communicates with SMIP and controls the content on the display units 12 through the creation and reading of files on the in-store control unit 67. Software designated as KartKom, which also runs on the in-store control unit 67, reads the files created by SCIP and acts as a server for information for the display units 12. A radio transmitter may be placed near the ceiling of a store that communicates with KartKom over a standard Ethernet link and passes information between KartKom and the display units 12.

The portion of the software that resides in the ROM 76 of the display unit 12 is designated as Firmware. The program residing on the display unit 12 which performs user interactions is designated as CAP (Cart Application Program). CAP interprets user key presses and timed features such as sleep and scrolling. A binary file, designated as Kad, may also be utilized which includes the graphics, chime and animation timing used for a single ad.

SMIP allows graphic designers to combine a graphic file and chimes into timing loops to create a "Kad" animation to be displayed on the display units 12 when a corresponding trigger is received from a transceiver unit 65. SMIP also allows the targeting of stores to which a certain Kad goes to and also includes the date when the Kad is to start and stop. SCIP checks in to SMIP at regular intervals to insure that it has the current information for that store. SMIP also retrieves all store status information during this communication, including which display units 12 and transceiver units 65 are active, etc.

SCIP processes the timing information that it receives from SMIP and determines which Kads are active at any given time. SCIP may also create relocation reports that can be displayed on the display units 12 to assist servicing personal in moving the transceiver units 65 from old to new locations. SCIP may also ensure that KartKom is active. SCIP may also review reports created on the display unit 12 and sent to the in-store control unit 67 through KartKom. Reports referred to as "Check in" reports may be processed by SCIP to identify problems, such as low battery levels, missing display units 12, etc.

While KartKom is running, it may constantly read a version file to determine if there are any changes to what it considers current. If a change is detected, or if it is first booting up, it may load a current version of the following items into memory:

Firmware

CAP

Kads

Locators—the store directory that is displayed on the display units 12

Configuration File—to control the look and behavior of the display unit 12, including the frequency for sending advertisements and promotions, no-motion sleep mode, etc.

Graphic files for the default screens, etc.

When any of these files are changed, KartKom may read the new files into memory and create a new list of what is "current". Several times per second, KartKom may transmit a header "heart beat" so that any display units 12 that have just become active can receive this updated list to determine if it has the latest version of all files in memory. If not, the display unit 12 will send a request to the KartKom for any files that need to be updated, which KartKom then sends down via an in-store radio LAN.

KartKom may also collect information about which display units 12 have or have not "checked in" during the last 24 hours, and its last operating status such as battery voltage, path data, transceiver unit 65 voltages, etc.

The radio transmitter placed near the ceiling of a store for communicating with KartKom may comprise components manufactured by Proxim Inc., such as the RangeLAN2 Ethernet and Token Ring Access Points. The radio transmitter coordinates radio traffic so that all radios with the correct security password and settings can receive and transmit data between the display units 12 and KartKom.

In one embodiment, the display unit 12 may comprise a custom plastic housing, LCD reflective display, a changeable, customizable overlay, a Proxim OEM radio, antenna, scroll buttons 30 and selection buttons 33, IR photo diodes 68, speaker and circuit board that contains a motion detector, temperature sensor (for adjusting LCD contrast with temperature), a Dragonball VZ CPU (used in Palm Pilots handheld computers) 58, RAM 74 and ROM 76.

Firmware may be utilized for communicating with the hardware and KartKom and insuring that needed files are present and up to date on the display unit 12. Once all files are current, control is turned over to CAP and the firmware is only involved in gathering input such as motion, key presses, IR, etc., and informing CAP of these inputs.

After a period of inactivity, a software timer may place the display unit 12 into low power mode referred to as "sleep". When the display unit 12 is in "sleep" mode, the Firmware may monitor motion and "wake up" when motion is detected. The display unit 12 may also have fixed times of the day when it will "wake up" and listen to the radio to insure that data on the display unit 12 is up to date.

CAP's function is to respond to input. If CAP detects that it is near a transceiver unit 65, it displays a Kad which may contain a chime and animation to draw the consumers attention to the featured product. Once a Kad has been displayed, CAP may be programmed to block the Kad from replaying for a desired time, such as for about 30 seconds. CAP may also monitor the buttons on the display unit 12. For example, a button may display a store directory or retailer specific specials. Another button may display product brand-casting (BrandKasting), referred to when a single slide will be temporarily displayed from each of the Kads. At software controlled fixed intervals, BrandKasting may occur even without the consumer pressing any buttons.

CAP may also monitor motion and reset the "awake" timer anytime that motion is detected. When no motion or button pushes have occurred for a fixed interval, CAP may create a packet of information including such things as "path data" (the order of transceiver units 65 passed during the shoppers travels through the store), battery voltage, awake time, etc., and then pass this information back to the control unit 67, where SCIP can process it. CAP may then return control to the Firmware to go into sleep mode.

The transceiver unit 65 may transmit a code indicating the number of the Kad that it is featuring. The code may also contain information about the transceiver unit's 65 battery condition. A display unit 12 may also detect that the battery for a particular transceiver unit 65 is low and relay that information to SCIP. Each transceiver unit 65 may also contain an IR receiver, with which to change the Kad number that it transmits. A commercially available TV remote may also be used to change the transceiver unit 65 number.

In one embodiment, a hardware/software system designated as KNET creates and manages data. Display unit 12 software and content, store information, advertisement information, reporting and accounting tools may be centrally controlled on the KNET server and LAN at the store affiliate headquarters 154 using SMIP. The KNET server program, designated as KSERV, may reside on the KNET server and interface (via the internet) database and binary file information between the KNET server and the program that resides on the in-store located computer designated as SCIP. SCIP may be utilized for enabling communication with the KSERV program server via the internet by dialing into a local internet service provider (ISP) and connecting to KSERV. Once the connection is made, SCIP may request data through KSERV to become current with the KNET server. SCIP may also pass all system information back to the server for processing. The automatic retrieval and processing of such system information as the display unit 12 and transceiver unit 65 functionality, display unit 12 and transceiver unit 65 voltage readings, and display unit 12 path data, render the system management relatively simple.

The SMIP program can be run on a typical commercially available computer, which in turn can be connected to the LAN at the store affiliate headquarters 154. SMIP provides KNET server database connectivity and provides a means for creating various "screens," or "display frames," that appear on the display unit 12. SMIP may be used for managing all system information and centralizing all data respective to a particular store. Concurrency with the KNET server may be verified through the control unit 67 with Firmware, CAP or a file list. SMIP may also be used to view update information, such as the last time a store connected to the server and updated information. SMIP may also be used to set demographic information. Stores can apply this information to target advertisements/promotions or any other feature in the system.

SMIP may also be used as an advertisement designer to create and simulate advertisements, such as the manufacturer name of particular packaged goods, product UPC, coupon information and category information. Default and specials screens can also be created with SMIP. For example, "screens", or "frames" may be 640×200 1 bit images. Frames may either be created in this section or imported from another application. Animation frames may also be linked together in an order and given looping and timing information. A single frame from the advertisements can be selected to be the frame that is displayed in an advertisement scrolling routine.

Through SMIP, the in-store control unit 67 may view/edit store content for the following: advertisement versions, CAP versions, Firmware versions, store directory, configuration information, advertisement start/stop date/times, and set the transceiver unit 65 identification number.

SMIP may also be used as a reporting tool to generate reports on store status. Such reports may include information such as the activation history of a particular display unit 12 which provides the path the display unit 12 through the store and when the transceiver units 65 were "seen." Other reports may include and inventory of the number of working and non-working display units 12 or transceiver units 65 in a particular store. Another report may include a "last heard from at x date/time" alert. Operations personnel as well as packaged goods manufacturers can view the status of a system using a web client.

SMIP may also be used to track consumer goods companies' activity and generate billing information based on store reports. Other programmable features of SMIP may include implementation of standard category information for store directories so that advertisements can use their category information to automatically display aisle location. SMIP may also include support functions such as coupons obtained through the internet or the data card 94 previously described.

Another embodiment utilizes an in-store position system to identify the position of display units 12. Transceiver units 65 may then be implemented as locations on a map within which to display a certain advertisement or promotion.

A store controller interface program (SCIP) may maintain store data at a local level and then propagate the data to the display units 12 via an in-store wireless LAN (ISWL) when scheduled. SCIP may be used for connecting to the internet and checking the KNET server for file updates. Once updates are found and downloaded, SCIP may schedule the changes in the system. SCIP may also manage ISP dial-up information required to connect to the internet. SCIP may receive KNET updates such as by connecting to KSERV, and then comparing internal file versions to the KNET server file versions to build an update list. SCIP may then download necessary updates to become current with the KNET server. SCIP may also schedule file changes on the display units 12 by writing interface files to KartKom, which may control ISWL broadcast information. SCIP may also include features that allow operations personnel and store personnel to change store directory information in the event of an error. In the case of failure, SCIP may be programmed to send email and/or page a technician assigned to a particular store. If permanent connections are available, SCIP may be utilized as a simple web client that mirrors store specific data from the KNET server.

KSERV is an internet socket server that handles incoming SCIP requests for information from the KNET server. KSERV may generate database queries to answer SCIP requests and to link results back to corresponding SCIP sockets. KSERV may also act as a FTP (file transfer) server for SCIP. KSERV may serve as an interface program between SCIP and Operations databases, which reside on the KNET server. KSERV may then handle all requests from SCIP for data, such as database information as well as binary file transfers.

In another embodiment, all components of the retail equation, including individual stores, retailers, consumer goods companies and advertisement agencies may be interconnected via the internet with the advertising and promotion system.

The advertising and promotion system may provide enhanced data mining and data warehousing services for retailers and consumer goods companies to collect consumer purchase data. The advertising and promotion system may also enable retailers and consumer goods companies to analyze shopping trends. The advertising and promotion system may also provide a platform to permit consumer goods companies and retailers to perform direct marketing campaigns to targeted consumer or consumer groups. Direct marketing to consumers encompasses a variety of services ranging from the direct mail, product sampling, rebates, special promotions, wedding/baby registry, recipe storage and other targeted marketing efforts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electronic shopping cart display system comprising:
   a display unit having a display screen in operable connection with a computer unit and attached to a shopping cart for displaying information, the display unit being integrated into the handle of the shopping cart, the display unit having a power source located within the handle of the shopping cart;
   at least one of a transceiver unit and a RFID unit structured to send information to the computer unit onboard the shopping cart, allowing passive reception of product specific promotions and advertising materials to appear on the display unit associated with the shopping cart without the use of trigger signals associated with fixed positions in the store, wherein the information comprises a non-repetitive visual message containing product-specific promotions;
   a transmitter in direct communication with at least one of the transceiver unit and the RFID unit, for sending information to at least one of the transceiver and the RFID unit;
   the computer for operating the interaction between the display unit, the transceiver units, RFID tags and the transmitter in direct electronic communication with the transmitter unit and in indirect electronic communication with the transceiver unit through the transmitter, allowing passive reception of product specific promotions and advertising materials to appear on the display unit associated with the shopping cart without the use of trigger signals associated with fixed positions in the store, wherein the information comprises a non-repetitive visual message containing product-specific promotions, and contemporaneously allowing user to interactively request information utilizing the computer display, said requested information being transmitted from a communication center resident at the store through one of said transceiver unit and RFID unit, for display on said display screen substantially immediately without contextually meaningful delay.

2. An electronic shopping cart display system according to claim 1, wherein the display unit includes buttons for enabling a user to select information requests and directions.

3. An electronic shopping cart display system according to claim 1, wherein the display unit automatically receives a signal for providing information.

4. An electronic shopping cart display system according to claim 1, wherein the transceiver unit provides independent processing of data and independent communication with the display unit.

5. An electronic shopping cart display system according to claim 4, wherein the transceiver unit has a separate identification such that data transmitted from the computer is transmitted throughout a store but is processed and stored only by a transceiver unit to which the data is intended.

6. An electronic shopping cart display system according to claim 1, wherein the transceiver unit includes at least one of an RFID tag and a proximity sensor that detects the presence of a shopping cart within a programmed range and initiates transmission of the trigger and data signals to the display unit.

7. An electronic shopping cart display system according to claim 1, wherein the transceiver unit includes a radio frequency receiver to receive radio frequency transmissions from the computer.

8. An electronic shopping cart display system according to claim 1, wherein the display unit includes a radio frequency receiver to receive radio frequency transmissions from a transceiver unit.

9. An electronic shopping cart display system according to claim 1, wherein the display unit includes an infrared receiver infrared transmissions from a transceiver unit.

10. An electronic shopping cart display system according to claim 1, wherein the display unit includes a microwave receiver microwave transmissions from a transceiver unit.

11. An electronic shopping cart display system according to claim 1, wherein the display unit includes an ultrasonic receiver to receive ultrasonic transmissions from a transceiver unit.

12. An electronic shopping cart display system according to claim 1, wherein the display unit includes a sensor utilizing an ultrasonic signal for determining distance between the display unit and the transceiver unit.

13. An electronic shopping cart display system according to claim 1, further comprising a battery charger unit for powering the display unit.

14. An electronic shopping cart display system according to claim 1, wherein the computer, the display units, and the transmitter are linked through radio frequency transmissions.

15. An electronic shopping cart display system according to claim 1, wherein the computer, the display units, the transceiver units, and the transmitter are linked through at least one of RFID transmissions and infrared transmissions.

16. An electronic shopping cart display system according to claim 1, further comprising internet access for connecting a shopper directly to internet content.

17. An electronic shopping cart display system according to claim 1, further comprising an alarm when a shopping cart leaves a prescribed area.

18. An electronic shopping cart display system according to claim 1, further comprising a Global Positioning System means for locating a shopping cart's position at least one of outside a store and within a store.

19. An electronic shopping cart display system according to claim 1, further comprising a data card reader.

20. An electronic shopping cart display system according to claim 1, further comprising a motion sensor for limiting power or turning off power to a display unit when a particular shopping cart has not been in motion for a specified time.

21. An electronic shopping cart display system according to claim 1, wherein the transceiver unit includes an infrared receiver for changing information to be transmitted.

22. An electronic shopping cart display system according to claim 1, wherein the display unit further comprises a scanner for reading product UPC labels.

23. An electronic shopping cart display system according to claim 1, wherein the display unit further comprises a battery status indicator.

24. An electronic shopping cart display system according to claim 1, wherein the information includes product-specific promotions selected from a group comprising: electronic coupons, recipes, shopping lists and shopper content.

* * * * *